(12) United States Patent
Wang

(10) Patent No.: US 11,329,329 B2
(45) Date of Patent: May 10, 2022

(54) SYSTEMS AND METHODS FOR COOLING BATTERY CELLS

(71) Applicant: CHONGQING JINKANG POWERTRAIN NEW ENERGY CO., LTD., Chongqing (CN)

(72) Inventor: Jiaxian Wang, Santa Clara, CA (US)

(73) Assignee: CHONGQING JINKANG POWERTRAIN NEW ENERGY CO., LTD., Chongqing (CN)

(*) Notice: Subject to any disclaimer, the term of this patent is extended or adjusted under 35 U.S.C. 154(b) by 239 days.

(21) Appl. No.: 16/243,988

(22) Filed: Jan. 9, 2019

(65) Prior Publication Data

US 2020/0220235 A1 Jul. 9, 2020

(51) Int. Cl.
| | |
|---|---|
| *H01M 10/613* | (2014.01) |
| *H01M 10/653* | (2014.01) |
| *H01M 10/6568* | (2014.01) |
| *H01M 50/20* | (2021.01) |

(52) U.S. Cl.
CPC ....... *H01M 10/613* (2015.04); *H01M 10/653* (2015.04); *H01M 10/6568* (2015.04); *H01M 50/20* (2021.01); *H01M 2220/20* (2013.01)

(58) Field of Classification Search
CPC ............. H01M 10/613; H01M 10/653; H01M 10/6551; H01M 10/6556; H01M 10/6568; H01M 2220/20; H01M 50/20; Y02E 60/10
USPC ....................................................... 165/80.4
See application file for complete search history.

(56) References Cited

U.S. PATENT DOCUMENTS

| | | | | |
|---|---|---|---|---|
| 2009/0130545 A1* | 5/2009 | Wood | ............... | H01M 10/6566 429/90 |
| 2009/0214940 A1* | 8/2009 | Haussmann | ...... | H01M 10/6557 429/151 |
| 2009/0263708 A1* | 10/2009 | Bender | ............... | H01M 10/643 429/120 |
| 2010/0009248 A1* | 1/2010 | Fuhrmann | ........... | H01M 10/643 429/120 |

(Continued)

FOREIGN PATENT DOCUMENTS

| | | | | |
|---|---|---|---|---|
| DE | 102014014527 A1 * | 3/2016 | .......... | H01M 50/543 |
| DE | 102016206463 A1 * | 10/2017 | | |
| EP | 3633785 A1 * | 4/2020 | .......... | H01M 10/613 |

OTHER PUBLICATIONS

Machine Translation DE 102014014527 A1 (Year: 2014).*

*Primary Examiner* — Len Tran
*Assistant Examiner* — Gustavo A Hincapie Serna
(74) *Attorney, Agent, or Firm* — Cooper Legal Group, LLC

(57) ABSTRACT

Various arrangements for a battery module cooling system are presented. A thermal tower may be contoured to contact one or more battery cells. The thermal tower may include a holding member and a cooling member. A hollow interior region having a top aperture may be defined by the holding member. A portion of each of the one or more battery cells may be contacted by the cooling member to provide localized cooling to each of the one or more battery cells. A seal may be formed between the holding member and the cooling member by positioning the cooling member on the top aperture of the holding member. Optionally, the portion that the cooling members may contact to provide localized cooling may include a hot region having a higher temperature than other portions of each of the one or more battery cells.

11 Claims, 9 Drawing Sheets

(56) References Cited

U.S. PATENT DOCUMENTS

| | | | | |
|---|---|---|---|---|
| 2010/0028764 A1* | 2/2010 | Maier | H01M 10/6567 | 29/890.035 |
| 2010/0092849 A1* | 4/2010 | Wood | H01M 10/6557 | 429/120 |
| 2010/0119928 A1* | 5/2010 | Yoon | H01M 10/6562 | 429/163 |
| 2010/0119929 A1* | 5/2010 | Gaben | H01M 10/643 | 429/120 |
| 2010/0266886 A1* | 10/2010 | Joswig | H01M 50/213 | 429/120 |
| 2011/0033742 A1* | 2/2011 | Maier | H01M 50/20 | 429/120 |
| 2011/0151304 A1* | 6/2011 | Joswig | H01M 10/653 | 429/120 |
| 2011/0206964 A1* | 8/2011 | Odumodu | H01M 10/6557 | 429/120 |
| 2012/0040225 A1* | 2/2012 | Raiser | H01M 10/052 | 429/120 |
| 2013/0316202 A1* | 11/2013 | Bang | H01M 50/502 | 429/96 |
| 2014/0138042 A1* | 5/2014 | Yagi | H01M 10/66 | 165/10 |
| 2014/0162107 A1* | 6/2014 | Obrist | H01M 10/6556 | 429/120 |
| 2014/0242437 A1* | 8/2014 | Heise | H01M 10/625 | 429/120 |
| 2015/0200429 A1* | 7/2015 | Lee | F28D 1/0478 | 429/120 |
| 2015/0255836 A1* | 9/2015 | Kim | H01M 10/615 | 429/120 |
| 2016/0172727 A1* | 6/2016 | Chan | H01M 50/20 | 429/120 |
| 2018/0358664 A1* | 12/2018 | Zhang | H01M 10/613 | |
| 2019/0334134 A1* | 10/2019 | Reingruber | H01M 10/615 | |
| 2020/0168964 A1* | 5/2020 | Monismith | H01M 10/653 | |
| 2020/0194853 A1* | 6/2020 | Yoo | H01M 10/6555 | |
| 2020/0198496 A1* | 6/2020 | Fang | H05K 7/20263 | |
| 2020/0220121 A1* | 7/2020 | Day | H01M 50/1245 | |
| 2020/0220132 A1* | 7/2020 | Bourke | H01M 10/6556 | |
| 2021/0151821 A1* | 5/2021 | Shim | H01M 10/6557 | |

* cited by examiner

SYSTEMS AND METHODS FOR COOLING BATTERY CELLS

BACKGROUND

For battery module systems, specifically those employed by electric vehicles, the batteries may need to be cooled to improve battery stability and workable life, maintain safe operating temperatures, and extend battery charge. For example, during charge and discharge cycles of a battery, electron movement within the battery causes the battery to heat up due to the electrical resistance. Increased temperatures may reduce the energy density of the battery and may reduce the workable life of the battery. Excessive temperatures may even damage batteries, causing the battery to ignite or explode if extreme temperatures are reached. While cooling batteries is needed, space requirements and cost for a battery module system are also concerns, especially when such a system is installed on an electric vehicle.

SUMMARY

Various embodiments are described related to a battery module cooling system. In some embodiments, a battery module cooling system is described. The battery module cooling system may include a thermal tower contoured to contact one or more battery cells. The thermal tower may include a holding member defining a hollow interior region having a top aperture. The hollow interior region may be configured to channel a cooling fluid. The thermal tower may also include a cooling member positioned to contact at least a portion of each of the one or more battery cells to provide localized cooling to each of the one or more battery cells. The cooling member may be positioned on the top aperture of the holding member to form a seal between the holding member and the cooling member.

Embodiments of such a battery module cooling system may include one or more of the following features: The holding member may include a first material and the cooling member may include a second material that is different that the first material. The second material may include a thermally-conductive flexible material. The holding member may be rigid and the cooling member may be flexible such to conform to and press against at least the portion of each of the one or more battery cells to provide localized cooling of the one or more battery cells. The battery module cooling system may also include the one or more battery cells. Each of the one or more battery cells may include a positive lead and a negative lead positioned on a top portion of each of the one or more battery cells. The portion that the cooling member may be positioned to contact to provide localized cooling may include a hot region having a higher temperature than other portions of each of the one or more battery cells. The hot region may be formed in each of the one or more battery cells within or proximate to the top portion. The thermal tower may contour to three battery cells. The thermal tower may be a triangular column with concave sidewalls such that the cooling member contacts at least the portion of each of the three battery cells.

In some embodiments, the battery module cooling system may also include a cooling system that provides localized cooling to the one or more battery cells. The cooling system may include an inlet through which the cooling fluid is introduced into an inlet reservoir. The cooling system may also include an inlet tube having a first aperture positioned proximate to the inlet reservoir and a second aperture positioned proximate to the top aperture of the holding member. The inlet tube may extend from the inlet reservoir into the hollow interior region of the holding member. The inlet tube may be volumetrically smaller than the hollow interior region of the holding member such to form an outlet volume between the inlet tube and an interior surface of the holding member. The second aperture of the inlet tube and the top aperture of the holding member may be configured to contact the cooling member with the cooling fluid immediately after the cooling fluid exits the second aperture of the inlet tube to provide localized cooling to the portion of the one or more battery cells. The cooling system may also include an outlet reservoir into which the cooling fluid may be received from the outlet volume. The cooling system may also include an outlet through which the cooling fluid may be disposed of from the outlet reservoir. The cooling system may include a plurality of thermal towers forming at least one battery cell chamber having a volumetric shape that is complementary to the one or more battery cells such to hold the one or more battery cells. The cooling system may also include at least one cooling pad positioned at a bottom end of the at least one battery cell chamber between the outlet reservoir and the at least one battery cell chamber to provide cooling to a bottom portion of the one or more battery cells. The at least one cooling pad may include a first material having conductive properties. The first material may be the same material as the cooling member and the holding member may include a second material that is different than the first material. The cooling system may also include a plurality of inlet tubes and a reservoir separator positioned between the inlet reservoir and the outlet reservoir to separate the inlet reservoir and the outlet reservoir. The plurality of inlet tubes and the reservoir separator may be a unitary component.

In some embodiments, a method for cooling a battery module is described. The method for cooling a battery module may include channeling a cooling fluid through a holding member defining a hollow interior region having a top aperture by an inlet tube positioned within the hollow interior region of the holding member. The method may also include locally cooling one or more battery cells by contacting a cooling member contoured to contact at least a portion of the one or more battery cells and positioned on the top aperture of the holding member with the cooling fluid immediately after the cooling fluid exits the inlet tube. The method may also include channeling the cooling fluid through an outlet volume formed by the inlet tube being volumetrically smaller than the hollow interior region of the holding member. The method may also include receiving the cooling fluid from the outlet volume into an outlet reservoir.

Embodiments of such a method for cooling a battery module may include one or more of the following features: Locally cooling the one or more battery cells may include locally cooling a hot region formed on the one or more battery cells. The hot region may have a temperature higher than other portions of the one or more battery cells. The cooling member may contour to contact at least a portion of three battery cells. The cooling member may include a flexible and thermally-conductive material designed to press against at least the portion of the three battery cells to provide localized cooling. The cooling member may have a triangular shape having concave sidewalls such to conform to at least the portion of three battery cells.

In some embodiments, a battery cooling module system is described. The battery cooling module system may include a first means of channeling a cooling fluid that defines a hollow interior region having a top aperture. The battery cooling module system may also include a second means for cooling one or more battery cells using the cooling fluid received through the top aperture from the first means. Cooling the one or more battery cells may include immediately contacting a first side of the second means with the cooling fluid while a second side of the second means contacts a portion of the one or more battery cells.

Embodiments of such a battery cooling module system may include one or more of the following features: The portion of the one or more battery cells may include a hot region formed due to each of the one or more battery cells including a positive lead and a negative lead positioned on a top portion of the one or more battery cells. The hot region may have a temperature higher than other regions of the one or more battery cells. The second means may include a flexible and thermally-conductive material.

DETAILED DESCRIPTION

Figure 1:
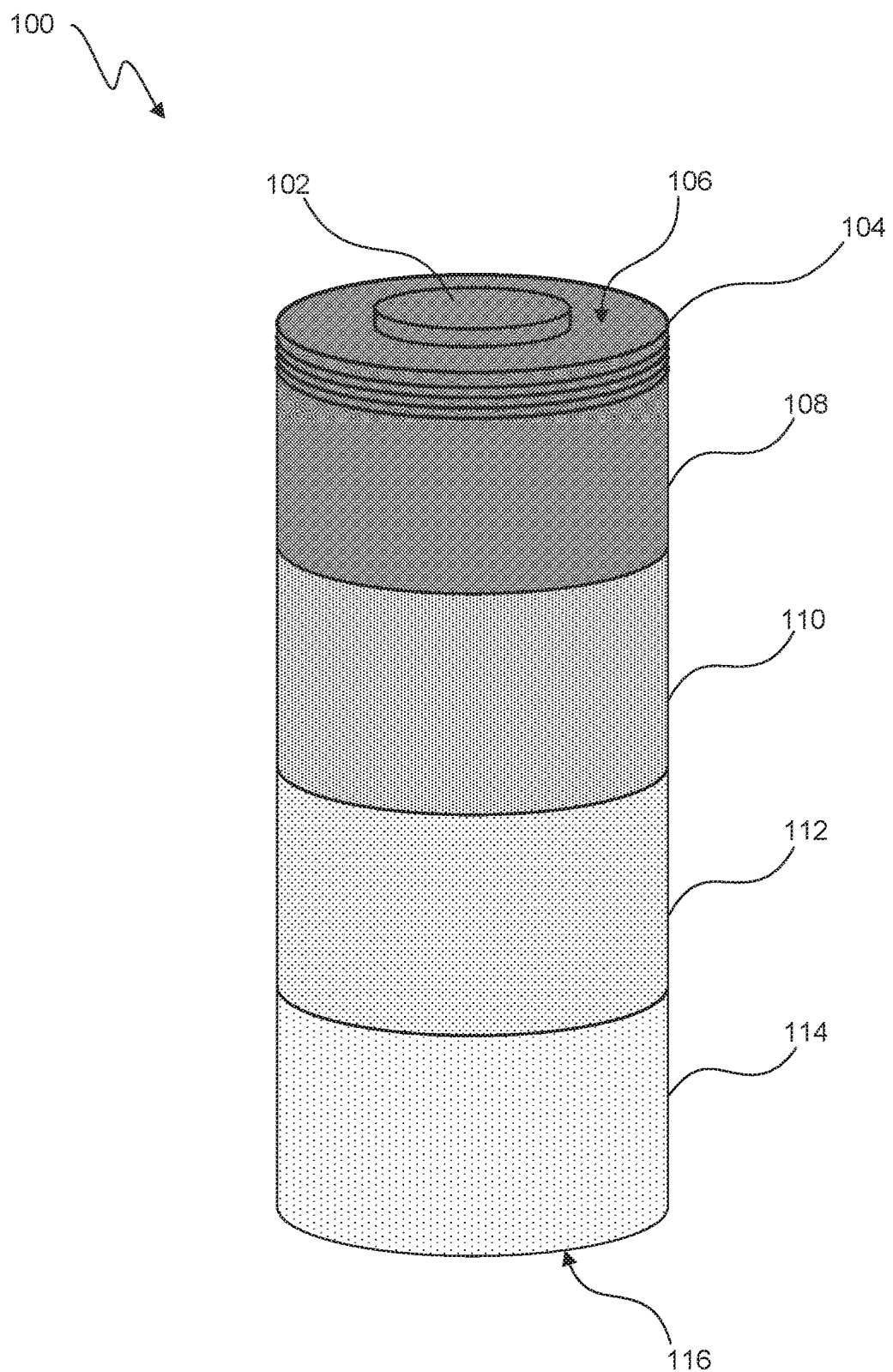
FIG. 1 illustrates an embodiment of a battery cell indicating a thermal gradient.

For battery modules, may be important to cool the battery cells housed within the module. It may be especially important to cool battery cells used in electric vehicles because of the vehicle's electrical requirements and safety concerns. During charging and discharging of a battery cell, electrons flow through the battery cell, to and from the positive and negative leads, causing the battery cell to heat up due to electron friction and electrical resistance. This can be especially true for battery cells having both the positive lead and the negative lead on the same surface, such as a top surface. Battery cells having both leads on the same surface can be prone to heat generation due to increased electron friction caused by the close proximity of the leads. Heat generation results in increased temperatures which can damage the battery cell. For example, increased temperatures may impact the workable life of the battery cell, reduce energy density, or even result in the battery cell igniting or exploding if excessive temperatures are reached. Accordingly, it is important to adequately cool battery cells. In order to maintain a healthy charging life and maintain safe charging/discharging conditions, cooling of the battery cells may be beneficial.

A cooling chamber module may be used to cool the battery cells. While cooling systems may be used to cool the battery cells, uneven cooling of the battery cells may still allow hot regions to form on the battery cells. For example, uneven cooling may occur because only a portion or single side of the battery cell is contacted by a cooling panel or device. This may result in inadequate cooling of the other portions of the battery cell, allowing for increased temperatures, and even damage to the battery cells by the generated heat. In order to adequately cool the battery cells, a cooling chamber module providing localized cooling may be used to cool the battery cells. One or more cooling members may be used to press against and cool a battery cell at a localized portion having the highest electron movement in order to address hot regions formed by electrical resistance. A cooling fluid may be flowed through the cooling member to maintain an efficient temperature differential to adequately cool the battery cells.

In addition to cooling battery cells, for battery cells used in electric vehicles, space may also be a concern. In order to provide space efficient cooling, a battery module cooling system having thermal towers through which the cooling fluid can be channeled to contact and cool the battery cells may be used. In embodiments, the thermal towers may contour to contact one or more battery cells. For example, a thermal tower may be a triangular column with concave sidewalls such to contact three battery cells. Additionally, the thermal towers may include a cooling member that is similarly configured to contour to one or battery cells and a holding member. The holding member and the cooling member may be made of different materials. Specifically, the cooling member may be made from a thermally-conductive flexible material while the holding member may be made out of a rigid material.

Further detail regarding such embodiments and additional embodiments are provided in relation to the figures. FIG. 1 illustrates battery cell 100 indicating a thermal gradient according to an embodiment as disclosed herein. Battery cell 100 may be cylindrical and/or Lithium-ion (Li-ion) battery cell. For example, the battery cell 100 may be a 18650, 20700, 21700, or 22700 Li-ion battery cell. However, in some embodiments, battery cell 100 may be a hydrogen fuel cell, a lithium-sulfur battery cell, a graphene supercapacitor, a sodium-ion battery cell, a lithium air battery cell, a magnesium-ion battery cell, an aluminum-graphite battery cell, a bioelectrochemical battery cell, or any other battery cell. While FIG. 1 illustrates battery cell 100 in a cylindrical shape, in various embodiments, battery cell 100 may be non-cylindrical. For example, battery cell 100 may be rectangular, square, button, or in a pouch-like form.

Battery cell 100 may include positive lead 102 and negative lead 104. Both positive lead 102 and negative lead 104 may be positioned on top side 106 of battery cell 100. Positioning of both positive lead 102 and negative lead 104 on the same side of battery cell 100 may be done for ease of current collection and space efficiency. By having both leads on the same side, more compact current collection methods may be utilized. In some embodiments, positive lead 102 and negative lead 104 may be positioned on different sides. For example, positive lead 102 may be positioned on top side 106 while negative lead 104 may be positioned on bottom side 116.

Hot region 108 may form in a portion of battery cell 100, in part, due to the positioning of positive lead 102 and negative lead 104 on the same surface, such as top side 106. In some embodiments, hot region 108 may form because of the positioning of positive lead 102 and negative lead 104 on different surfaces, such as positive lead 102 on top side 106 and negative lead 104 on bottom side 116, or vice versa. Hot region 108 may have a higher temperature than other portions of battery cell 100. For example, hot region 108 may have a higher temperature than region 110, region 112, or region 114. The higher temperature of hot region 108 may be due in part to increased electron movement through hot region 108.

When positive lead 102 and negative lead 104 are positioned on top side 106, as illustrated in FIG. 1, all electrons flowing through battery cell 100 may flow through hot region 108 during charging and discharging of battery cell 100. This may result in hot region 108 having more electron movement than region 110, region 112, or region 114. For example, if battery cell 100 is divided in four regions, hot region 108, region 110, region 112, and region 114, hot region 108 may have four times the amount of electron movement than region 114 during charging and discharging of battery cell 100. Because electrons flow from negative lead 104 to positive lead 102, during discharging, and from positive lead 102 to negative lead 104, during charging, all electrons travel through hot region 108. In contrast, not all the electrons flowing into and out of the leads 102 and 104, may travel to region 110, region 112, or region 114, meaning that region 110, region 112, or region 114 may have lower electron movement than hot region 108. The further away a region of battery cell 100 is from leads 102 and 104, the lower the electron movement may be because of a decreasing drop in electrical potential. This may mean that region 112 may have more electron movement than region 114, region 110 may have more electron movement than region 112, and hot region 108 may have more electron movement than region 110. Thus, hot region 108 may have more electron movement than any other region, such as region 110, region 112, or region 114, in battery cell 100.

The higher the electron movement through a region in battery cell 100, the higher the temperature of the region becomes. Electron movement causes an increase in temperature due to electron friction and/or electrical resistance between the electrons and atoms of materials within battery cell 100. Because higher electron movement results in an increase in temperature, hot region 108 may have a higher temperature than other regions of battery cell 100. For example, region 112 may have a higher temperature than region 114, region 110 may have a higher temperature than 112, and hot region 108 may have a higher temperature than region 110.

Figure 2:
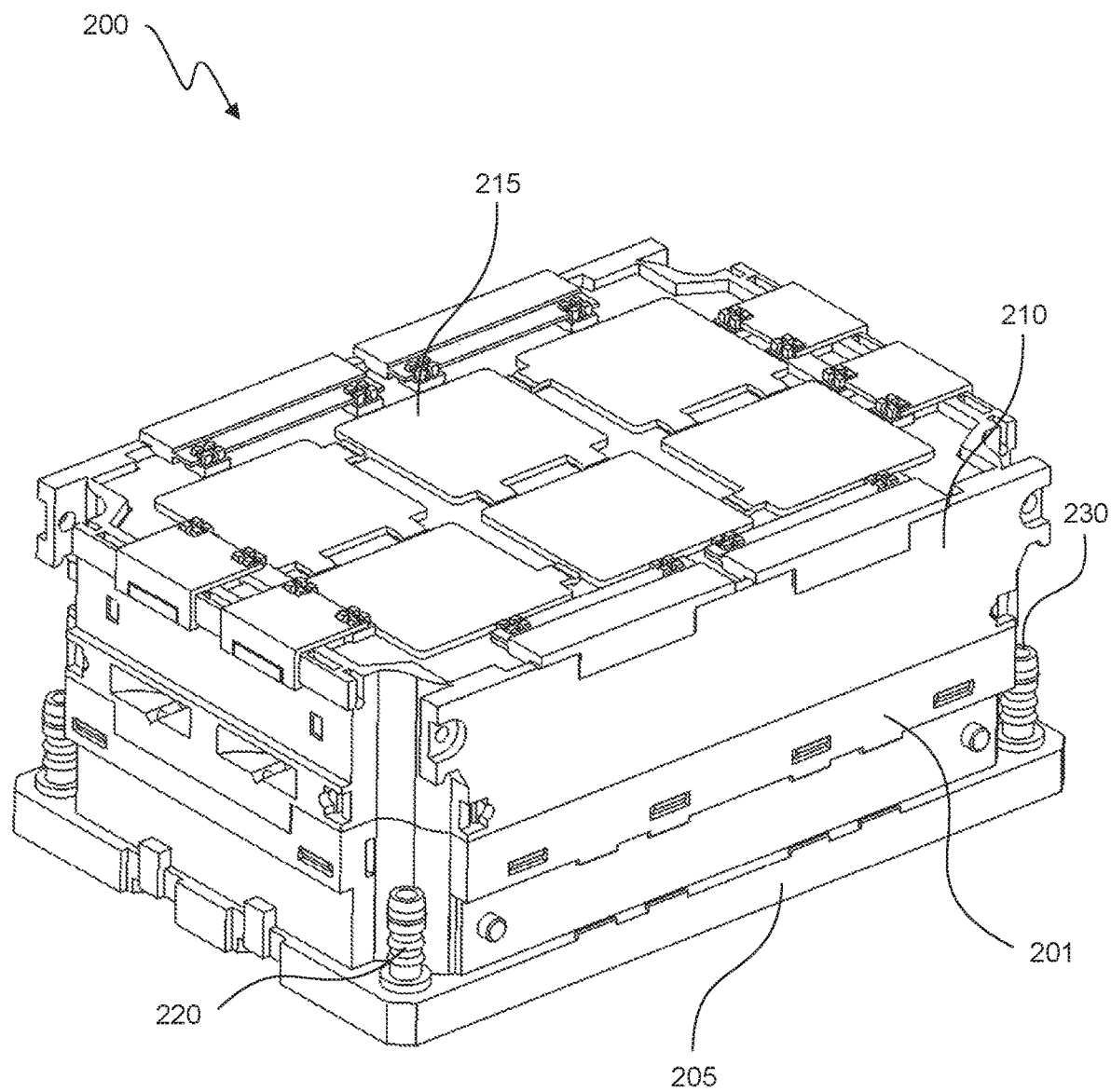
FIG. 2 illustrates an assembled battery module cooling system according to an embodiment as disclosed herein.

Providing localized cooling to hot region 108 may provide more efficient and effective cooling of battery cell 100 because of the higher temperature of hot region 108 comparative to other regions 110, 112, and 114. FIG. 2 illustrates battery module cooling system 200 configured to provide localized cooling to battery cells, such as battery cell 100, according to an embodiment disclosed herein. Battery module cooling system 200 may include cooling chamber module 201 and top module 210. Cooling chamber module 201 may be configured to house and cool one or more battery cells, such as battery cell 100. Cooling chamber module 201 may include base member 205, inlet 220, and outlet 230. Inlet 220 may be configured to introduce a cooling fluid into cooling chamber module 201 and outlet 230 may be configured to dispose of the cooling fluid out of cooling chamber module 201. Top module 210 may be configured to fit and attach with cooling chamber module 201 to secure one or more battery cells within battery module cooling system 200. Top module 210 may include a current collector (not shown) and cover 215.

Battery module cooling system 200 may employ a cooling fluid to provide localized cooling to the one or more battery cells housed within battery module cooling system 200. Exemplary cooling fluids include water, glycols (e.g., ethylene glycol), oils (e.g., mineral oils or silicone oils), refrigerants (e.g., R-744), nanofluids, liquid gases, or any other coolant meeting the system's thermal capacity and viscosity requirements. In some embodiments, the cooling fluid may use a closed looped system as part of the cooling fluid's circulation through battery module cooling system 200. In such embodiments, excesses heat that the cooling fluid picks up during cooling of the one or more battery cells may be withdrawn to reestablish a desired cooling temperature of the cooling fluid for recirculation. For example, after being channeled through battery module cooling system 200 the cooling fluid may be recirculated through a vehicle's radiator to reduce the cooling fluid's temperature before reintroducing the cooling fluid into battery module cooling system 200. Optionally, the cooling fluid may require recharging, supplementing, or changing depending on the cooling fluid employed. A pump may be employed to channel the cooling fluid through battery module cooling system 200. In other embodiments, a compressor may be employed or any other means thereof to channel the cooling fluid through battery module cooling system 200.

As illustrated in FIG. 2, battery module cooling system 200 is in an assembled state. One or more components may be housed within an interior region of battery module cooling system 200 or within an interior region of cooling chamber module 201, and thus may not be visible when battery module cooling system 200 is assembled. One or more components housed within the interior region of battery module cooling system 200 may include thermal towers, inlet tubes, a reservoir separator, cooling pads, and one or more battery cell. The one or more components housed within battery module cooling system 200 are discussed in greater detail with respect to FIG. 3-8.

Figure 3:
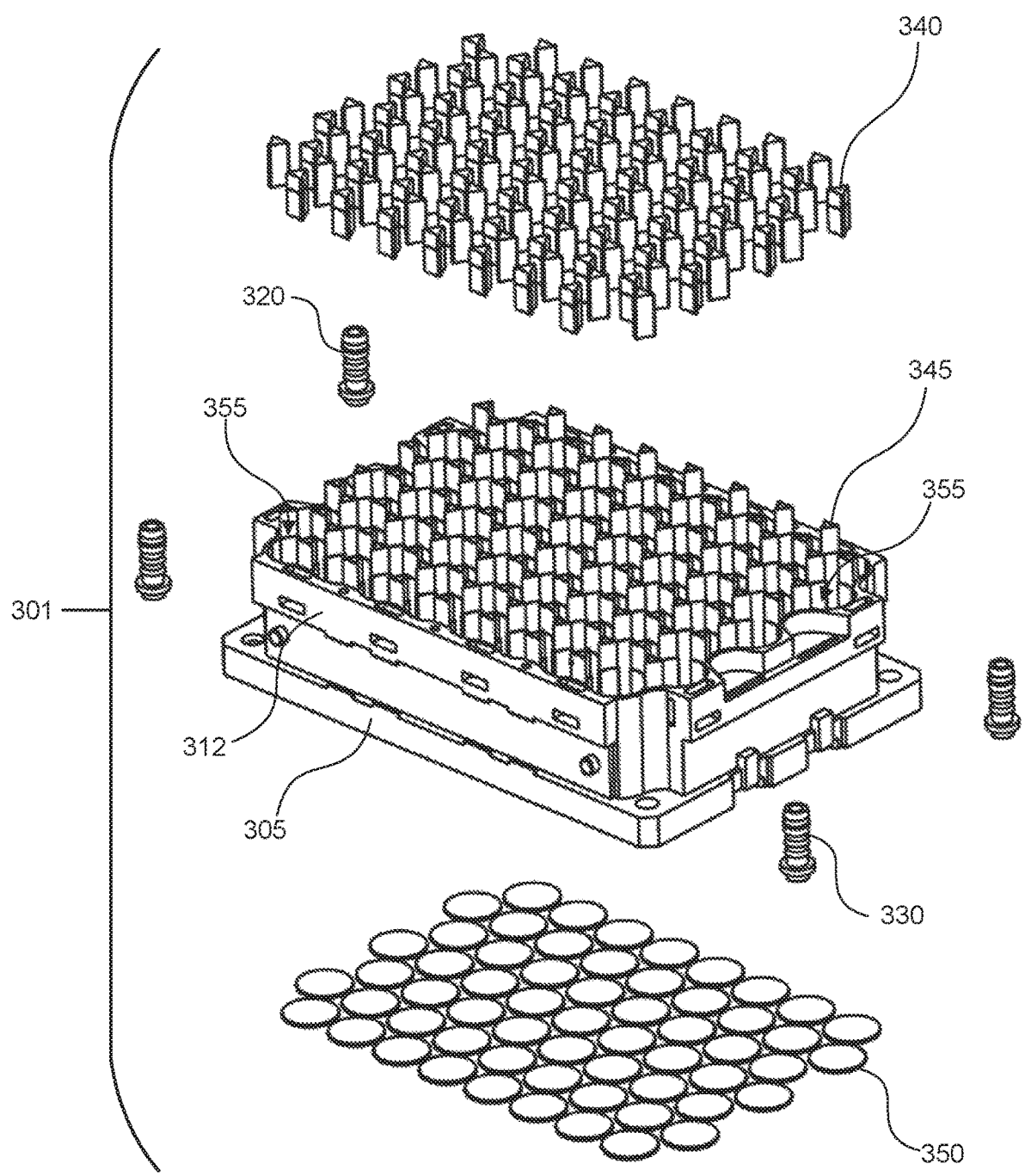
FIG. 3 illustrates an exploded perspective of a cooling chamber module for a battery module cooling system according to an embodiment as disclosed herein.

FIG. 3 provides an exploded perspective of cooling chamber module 301 for a battery module cooling system according to an embodiment as disclosed herein. Cooling chamber module 301 can represent a detailed embodiment of cooling chamber module 201. Cooling chamber module 301 may be part of a battery module cooling system, such as battery module cooling system 200 discussed with respect to FIG. 2. As illustrated in FIG. 3, cooling chamber module 301 may include various components that hold and function to locally cool one or more battery cells, as discussed in FIG. 1 and FIG. 2. Such components may include holding members 345, cooling members 340, cooling pads 350, inlet 320, and outlet 330. As noted above, when a battery module cooling system is assembled, one or more of these components may not be visible because they are housed within an interior region of the battery module cooling system.

Cooling chamber module 301 may include housing 312 configured to hold and secure one or more battery cells, such as battery cell 100. Housing 312 may be generally rectangular in shape, having base member 305 and at least four exterior walls. Extending axially upwards from base member 305 may be a plurality of holding members 345. Holding members 345 may be configured to support and secure one or more battery cells within cooling chamber module 301. In various embodiments, holding members 345 may be configured to contact at least a portion of one or more battery cells when housed within housing 312. One or more battery chambers 355 may be formed between one or more of holding members 345. Battery chambers 355 may have a volumetric shape that is complementary to one or more battery cells such to securely house the one or more battery cells. Battery chambers 355 may be cylindrical in shape, extending axially upwards from base member 305. In various embodiments, battery chambers 355 may have a different shape or be oriented in a different direction. For example, battery chambers 355 may be rectangular, hexagonal, spherical, or any other shape that complements a battery cell.

In embodiments, housing 312 may be formed by an injection molding process, such as plastic mold injection. Forming housing 312 by injection molding may allow for housing 312 to be formed as a single component. However, in other embodiments, housing 312 may be formed from separate components. Housing 312 may be formed from a variety of materials including polymeric (i.e., plastic), metal, ceramic, or any other suitable materials. In some embodiments, housing 312 and holding members 345 may be formed as a single, unitary component. However, in other embodiments, holding members 345 may be formed as a separate component before being attached or coupled with housing 312.

Holding members 345 may be rigid, defining a hollow interior region having a top aperture. In various embodiments, holding members 345 may be semi-flexible, but still defining a hollow interior region. The hollow interior region may be configured to channel a cooling fluid through holding member 345. The cooling fluid may flow from base member 305, through holding member 345, and out of the top aperture of holding members 345. Positioned on the top apertures may be one or more cooling members 340. Cooling members 340 may be positioned on the top aperture of holding members 345 such to form a seal between holding member 345 and cooling member 340. Cooling members 340 may extend above the top aperture of holding members 345 such that a volume is formed above holding members 345 between an interior surface of cooling members 340 and the top aperture. When the cooling fluid is flowed through the hollow interior region of the holding member 345, the cooling fluid exits holding member 345 through the top aperture and immediately contacts cooling member 340. Holding members 345 in combination with cooling members 340 may form one or more thermal towers configured to securely hold and cool one or more battery cells within housing 312.

Cooling members 340 may be positioned to contact at least a portion of one or battery cells, such as battery cell 100. For example, one cooling member 340 may be configured to contact an upper portion of three battery cells when the three battery cells are positioned within three adjacent battery chambers 355. Cooling members 340 may be flexible such that cooling members 340 conform to and press against one or more battery cells to secure the one or more battery cells. Moreover, cooling members 340 may be flexible to conform to the one or more battery cells to ensure contact between cooling members 340 and the one or more battery cells to facilitate heat exchange. Cooling members 340 may include a thermally-conductive flexible material. The thermally-conductive material may allow for a higher rate of heat exchange between the cooling fluid on an interior side of cooling member 340 and the one or more battery cells on an exterior side of cooling members 340. For example, cooling members 340 may include a thermoplastic material or rubber having a high thermal conductivity value (k). The thermal conductivity value (k) of cooling members 340 may be higher than other materials such as 12 W/MK, with an electric insulation >$10^{10}\Omega$ within the battery module cooling system. For example, holding members 345 may include a first material that is different than the thermally-conductive material of cooling members 340. In embodiments, the first material of holding members 345 may still be thermally-conductive, however, the first material may not be as conductive as the thermally-conductive material of cooling members 340.

Cooling members 340 may be positioned on top of holding members 345 to provide localized cooling to a hot region formed on the one or more battery cells. In embodiments, the one or more battery cells housed and cooled by the battery module cooling system may include a positive lead and a negative lead positioned on a top portion of each of the one or more battery cells. Similar to battery cell 100 discussed with respect to FIG. 1, the one or more battery cells may form a hot region within or proximate to the top portion, in part due to the position of the positive lead and negative lead. The positioning of cooling members 340 on a top end of holding members 345 may be done to ensure contact by cooling members 340 to the hot region. Cooling members 340 may contact part or all of the hot region on the one or more battery cells. In embodiments, cooling members 340 may contact more of the one or more battery cells than just the hot region.

To cool the one or more battery cells housed within cooling chamber module 301, housing 312 may be configured to receive and channel a cooling fluid. To receive and channel a cooling fluid, housing 312 may include inlet 320 and outlet 330. In some embodiments, housing 312 may include two inlets 320 and two outlets 330. However, in other embodiments, housing 312 may include more than two inlets 320 and/or more than two outlets 330. As illustrated, inlets 320 and outlet 330 may be positioned on opposing corners from one another to facilitate the flow of cooling fluid through cooling chamber module 301. Inlets 320 and outlets 330 may be separate components from housing 312 that are configured to couple to housing 312 such to provide a seal between inlets 320, outlets 330, and housing 312.

Optionally, cooling chamber module 301 may include one or more cooling pads 350. Cooling pads 350 may be configured to provide cooling to a portion of the one or more battery cells. In some cases, cooling pads 350 may comprise the same material as cooling members 340. For example, cooling pads 350 may include a thermally-conductive material, such as a thermoplastic. In some embodiments, cooling pads 350 may comprise a different thermally-conductive material than cooling members 340. Similar to cooling members 340, cooling pads 350 may be configured to facilitate heat exchange between the one or more battery cells and the cooling fluid. Cooling chamber module 301 may be configured channel the cooling fluid such to contact a first surface of cooling pads 350 while a second surface of cooling pads 350 contacts a portion of the one or more battery cells. Cooling the one or more battery cells with the cooling fluid within cooling chamber module 301 is discussed in greater detail with respect to FIGS. 4, 5, 6A, and 6B.

Figure 4:
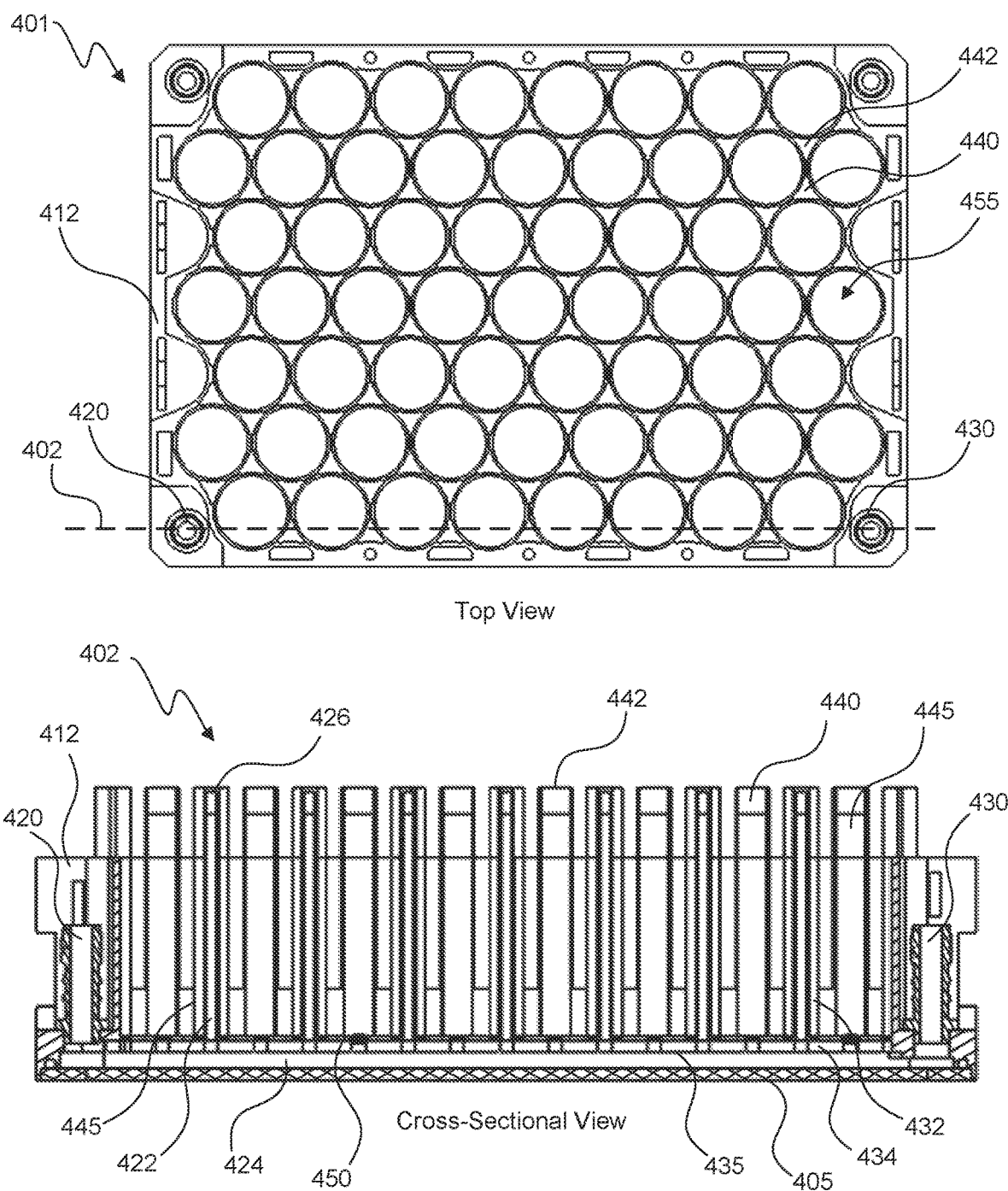
FIG. 4 illustrates a cross-sectional view of a cooling chamber module for a battery module cooling system according to an embodiment as disclosed herein.

Turning now to FIG. 4 which illustrates a top view and a cross-sectional view of cooling chamber module 401. Cooling chamber module 401 may be the same as cooling chamber module 301 or cooling chamber module 201 and may be configured to hold and cool one or more battery cells, such as battery cell 100. The top view of cooling chamber module 401 provides a view looking down from above onto cooling chamber module 401. The top view of cooling chamber module 401 illustrates the positioning and shape of a plurality of thermal towers 442 within cooling chamber module 401. Thermal towers 442 may include cooling members 440 and holding members 445. As illustrated, one or more battery chambers 455 may be formed between one or more thermal towers 442, forming a volume that is complementary to one or more battery cell, such as battery cell 100. From the top view, the only portion of thermal towers 442 visible may be cooling members 440. As noted above, in some embodiments, battery chambers 455 may form a different volumetric shape, depending on the shape of the one or more battery cells. Thermal towers 442 may be triangular in shape, having concave sidewalls such to conform to a cylindrical shape of one or more battery cells. In various embodiments, thermal towers 442 may contour to three battery cells. In cases where the one or more battery cells are not cylindrical, then thermal towers 442 may have a different shape that allows cooling members 440 to contact and cool at least a portion of the one or more battery cells.

Sectional view 402 is taken according to the dashed line in the top view of cooling chamber module 401. Sectional view 402 dissects inlet 420, outlet 430, and a plurality of thermal towers 442 to provide a cross-sectional view of cooling chamber module 401. As illustrated in sectional view 402, thermal towers 442 may extend axially upwards from base member 405 within housing 412. Thermal towers 442 may include holding members 445 and cooling members 440. Cooling members 440 may be positioned a top holding members 445. Positioned on opposing corner ends of cooling chamber module 401 may be inlet 420 and outlet 430. As illustrated in the top view of cooling chamber module 401, there may be two inlets 420 and two outlets 430. In various embodiments, there may be more than two inlets 420 and/or more than two outlets 430.

Inlets 420 may be configured to introduce a cooling fluid into cooling chamber module 401. As illustrated in sectional view 402, inlets 420 may be positioned axially above inlet reservoir 424. Inlet reservoir 424 may be formed between base member 405 and reservoir separator 435 and may be configured to retain a volume of the cooling fluid within cooling chamber module 401. The cooling fluid may be introduced into cooling chamber module 401 through inlets 420 and into inlet reservoir 424 where the cooling fluid may be retained until the cooling fluid is channeled, via a pump or otherwise, through one or more inlet tubes 422. Inlet tubes 422 may be positioned within a hollow interior region of holding members 445. Inlet tubes 422 may be volumetrically smaller than the hollow interior region of holding members 445 such to form outlet volume 432 between inlet tubes 422 and an interior surface of holding members 445. At both axial ends of inlet tubes 422 may be an opening or aperture, such as a first aperture at a bottom end and a second aperture at a top end. At the top axial end of inlet tubes 422 may be second aperture 426 configured to dispense the cooling fluid from inlet tubes 422. When inlet tubes 422 are positioned within the interior region of holding members 445, second aperture 426 may be positioned proximate to an interior surface of cooling members 440. When the cooling fluid is channeled through inlet tubes 422, upon exiting inlet tubes 422 via second apertures 426, the cooling fluid may immediately contact the interior surface of cooling members 440.

By positioning second aperture 426 proximate to the interior surface of cooling members 440, a more efficient rate of heat exchange may be achieved. Providing immediate contact of the cooling fluid with the interior surface of cooling members 440 may provide a larger temperature differential between the interior surface of cooling members 440 and an exterior surface of the cooling members 440. Because the exterior surface of cooling members 440 is contacting a portion of the one or more battery cells, the exterior surface may have a higher temperature than the interior surface of cooling members 440 which is contacting the cooling fluid. A higher differential in temperature between the interior surface and the exterior surface of the cooling member 440 may increase the rate of heat exchange between the cooling fluid and the one or more battery cell. Because the cooling fluid is likely to increase in temperature the longer it is within cooling chamber module 401, in part due to the heat of the one or more battery cells, it may be desirable to expose the interior surface of cooling members 440 as quickly or within as short as possible timeframe after the cooling fluid exits inlet tubes 422 via second apertures 426.

Outlet reservoir 434 may be formed between reservoir separator 435 and a bottom end of battery chambers 455. In embodiments, the bottom end of battery chambers 455 may include cooling pads 450. After the cooling fluid exits inlet tubes 422 via second apertures 426 and contacts the interior surface of cooling pads 450, the cooling fluid may channel through outlet volume 432 to outlet reservoir 434. Outlet reservoir 434 may be configured to receive the cooling fluid from outlet volume 432 and may be configured to retain the cooling fluid until the cooling fluid is disposed of through outlet 430. The cooling fluid may be retained in outlet reservoir 434 until the cooling fluid is channeled or otherwise pumped through outlet 430. In various embodiments, after being disposed of through outlets 430, the cooling fluid may be recirculated to a radiator to reduce the temperature of the cooling fluid before being reintroduced into cooling chamber module 401 via inlets 420.

Figure 5:
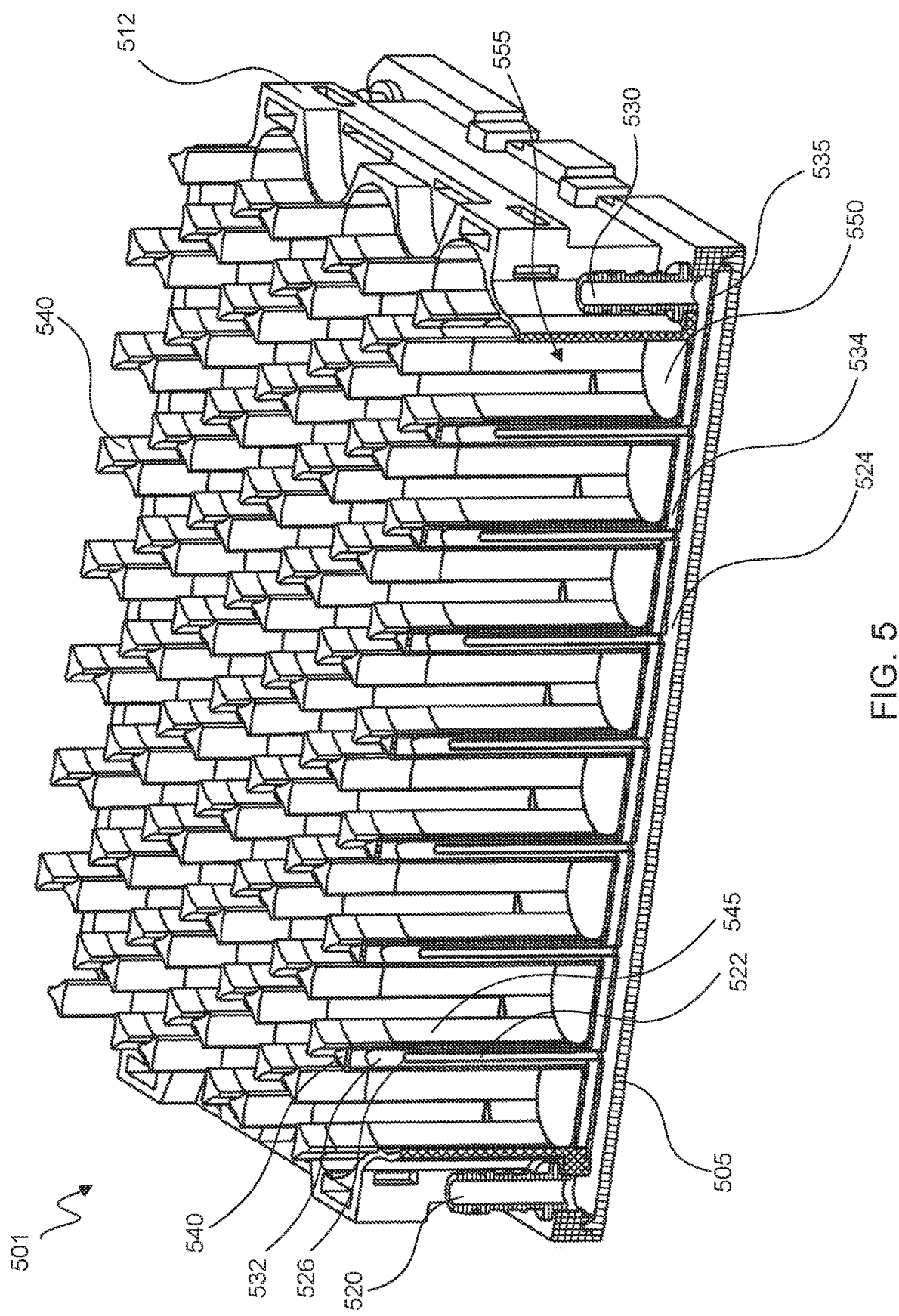
FIG. 5 illustrates a cutaway view of a cooling chamber module for a battery module cooling system according to an embodiment as disclosed herein.

FIG. 5 illustrates a cutaway view of cooling chamber module 501 for a battery module cooling system according to an embodiment as disclosed herein. Cooling chamber module 501 may be the same or similar to cooling chamber module 201, 301, and/or 401 discussed above. Cooling chamber module 501 may include housing 512 and base member 505 configured to house and store one or more battery cells, such as battery cell 100. Positioned within housing 512 may be various components, including a plurality of thermal towers 542 arranged to form one or more battery chambers 555. Battery chambers 555 may be a volume that is complementary to one or more battery cells such to securely hold the one or more battery cells. Thermal towers 542 may secure the one or more battery cells within battery chambers 555 by contacting and pressing against at least a portion of the one or more battery cells when the one or more battery cells are inserted into battery chambers 555.

Thermal towers 542 may include holding members 545 and cooling members 540. Holding members 545 may extend axially upwards from base member 505 and have a hollow interior region. At an axial top end, holding members 545 may have top apertures 546. Positioned over top apertures 546 may be cooling members 540, forming a seal between holding members 545 and cooling members 540. Inserted within the hollow interior region of holding members 545 may be inlet tubes 522. Inlet tubes 522 may include a hollow interior region as well, and have two apertures at either axial end: first aperture 525 and second aperture 526. First aperture 525 may be positioned proximate to inlet reservoir 524 and second aperture 526 may be proximate to top aperture 546 of holding members 545. Second aperture 526 may be arranged proximate to top aperture 546 such that cooling members 540 may be contacted by the cooling fluid immediately after exiting second aperture 526 to provide localized cooling to a portion of the one or more battery cells that are contacted by cooling members 540.

Inlet tubes 522 may be volumetrically smaller than the hollow interior region of holding members 545, forming outlet volume 532 between inlet tubes 522 and an interior surface of holding members 545. Outlet volume 532 may extend radially between the interior surface of holding members 545 and an exterior surface of inlet tubes 522 along the length of inlet tubes 522 down to outlet reservoir 534. Outlet volume 532 may be configured to channel the cooling fluid, after the cooling fluid exits second aperture 526 and contacts cooling members 540, down to outlet reservoir 534. As discussed with respect to FIG. 4, outlet reservoir 534 may be configured to receive the cooling fluid from outlet volume 532 and hold the cooling fluid until the cooling fluid is disposed of through outlet 530. In various embodiments, the cooling fluid may be recirculated such to reduce the temperature of the cooling fluid to a desired cooling temperature and reintroduce the cooling fluid back into cooling chamber module 501 via inlet 520.

To locally cool one or more battery cells, such as battery cell 100, a cooling fluid may be introduced into cooling chamber module 501 via inlet 520. Cooling chamber module 501 may include one or more inlets 520. For example, cooling chamber module 501 may include two inlets 520, three inlets 520, or four or more inlets 520, depending on the cooling requirements of cooling chamber module 501. After being introduced into cooling chamber module 501 via inlet 520, the cooling fluid may be received into inlet reservoir 524. Inlet reservoir 524 may be formed between base member 505 and reservoir separator 535. From inlet reservoir 524, the cooling fluid may be channeled through inlet tubes 522 via first aperture 525, exiting inlet tubes 522 through second aperture 526. Upon exiting second aperture 526, the cooling fluid may immediately contact an interior surface of cooling members 540. As used herein, the phrase "immediately contacting" means that the cooling fluid contacts no other surface before contacting the interior surface of cooling members 540. Additionally, the phrase contemplates both the temporal and physical distance between the cooling fluid leaving the second aperture 526 and the interior surface of cooling members 540 are such that cooling losses to the cooling fluid are negligible during the movement of the cooling fluid. In other words, thermal towers 542, specifically the arrangement of inlet tubes 522 and cooling members 540, are such that a temperature of the cooling fluid may be maintained from an inlet temperature of the cooling fluid when introduced into cooling chamber module 501.

After exiting second aperture 526 and contacting cooling members 540, the cooling fluid may be channeled down through outlet volume 532 to outlet reservoir 534. As the cooling fluid is channeled down through outlet volume 532, the cooling fluid may contact the interior surface of holding members 545. Holding members 545 may be configured to provide cooling to at least a portion of the one or more battery cells housed within battery chambers 555. While holding members 545 may include a material that is different than the material of cooling members 540, holding members 545 may still be configured to provide cooling to the one or more battery cells. That is, holding members 545 may include a thermally-conductive material that may be different than the thermally-conductive material of cooling members 540. Because holding members 545 may be rigid, in contrast to cooling members 540 which may be flexible, only a portion of holding members 545 may contact the one or more battery cells.

Outlet reservoir 534 may be formed between reservoir separator 535 and a bottom end of battery chambers 555. In various embodiments, the bottom end, or bottom surface, of battery chambers 555 may include cooling pads 550. The bottom end of battery chambers 555 may include a bottom structure having openings. When cooling pads 550 are positioned at the bottom end, the openings of the bottom structure may allow the cooling pads 550 to provide cooling to the one or more battery cells. Cooling pads 550 may be thermally conductive such to provide cooling to a bottom portion of the one or more battery cells. When the cooling fluid is retained in outlet reservoir 534, the cooling fluid may contact an underside surface of cooling pads 550 while an upper-side surface of cooling pads 550 facing the battery chamber 555 may contact the bottom surface of the one or more battery cells. Cooling pads 550 may exchange heat between the bottom surface of the one or more battery cells and the cooling fluid retained in outlet reservoir 534 such to provide cooling to the one or more battery cells. In some embodiments, cooling pads 550 may include the same thermally-conductive material as cooling members 540, while in other embodiments cooling pads 550 may include a different thermally-conductive material better suited to achieve a desired heat exchange rate between the cooling fluid and the one or more battery cells.

Outlet reservoir 534 may retain the cooling fluid until the cooling fluid is disposed of through outlet 530. Cooling chamber module 501 may include more than one outlet 530. For example, in embodiments, cooling chamber module 501 may include two outlets 530, three outlets 530, or four or more outlets 530, depending on the cooling requirements of cooling chamber module 501. After the cooling fluid is disposed of through outlet 530, the cooling fluid may be recirculated. As noted above, in various embodiments, recirculation of the cooling fluid may include circulating the cooling fluid through a radiator to reestablish a desired cooling temperature of the cooling fluid. Once the cooling fluid reaches the desired cooling temperature, the cooling fluid may be reintroduced into cooling chamber module 501 via inlet 520.

Figure 6A:
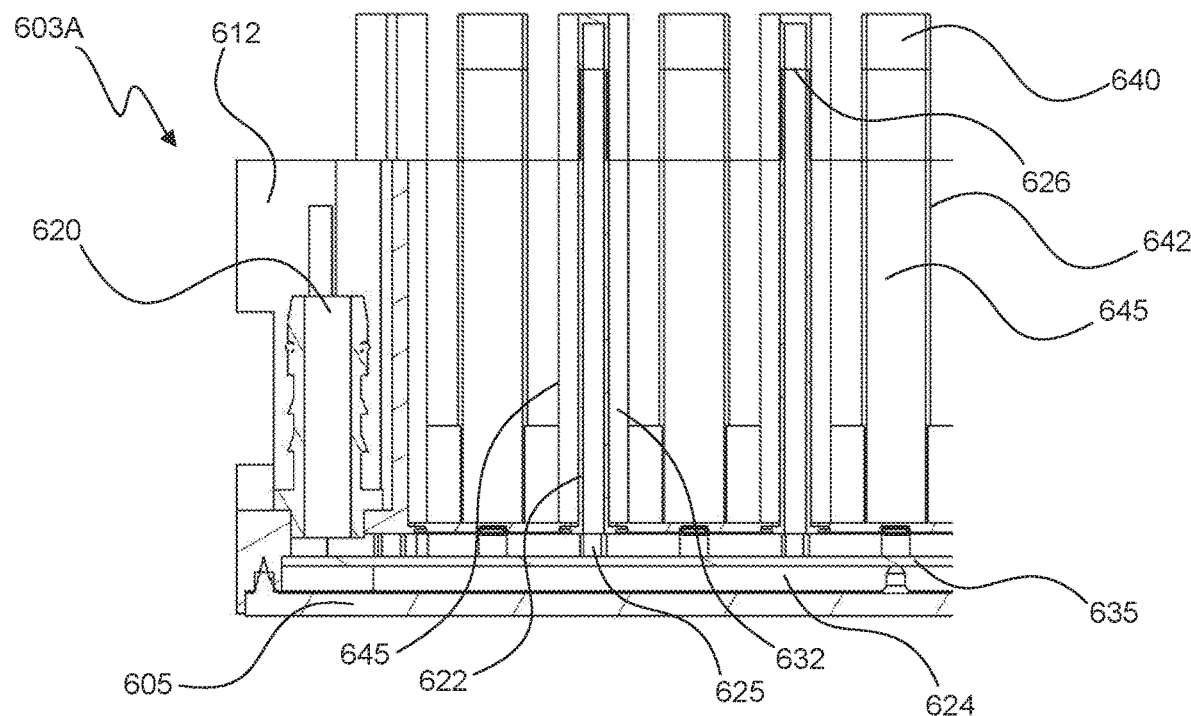
FIG. 6A illustrates a cross-sectional view of an inlet of a battery module cooling system according to an embodiment as disclosed herein.
Figure 6B:
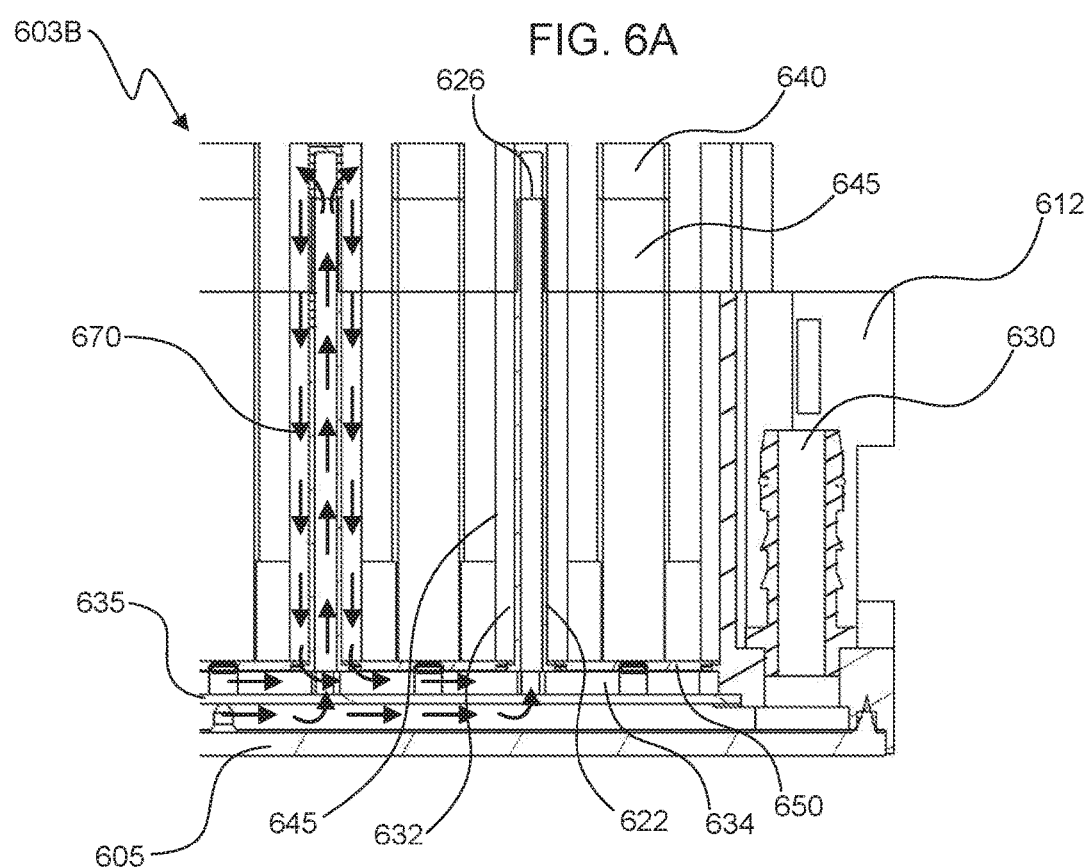
FIG. 6B illustrates a cross-sectional view of an outlet of a battery module cooling system according to an embodiment as disclosed herein.

FIGS. 6A and 6B illustrate cross-sectional perspectives of inlet view 603A and outlet view 603B, respectively. Inlet view 603A includes a portion of a cooling chamber module, such as cooling chamber module 201, 301, 401, and/or 501. Housing 612 and base member 605 may be part of the cooling chamber module. Positioned within housing 612 may be a plurality of thermal towers 642 comprising of holding members 645 and cooling members 640. Thermal towers 642 may be configured to hold and provide localized cooling to one or more battery cells. To securely hold the one or more battery cells, thermal towers 642 may be contoured the one or more battery cells. For example, thermal towers 642 may be triangular columns with concave sidewalls such that at least a portion of thermal towers 642, such as cooling members 640, contact a portion of each of any adjacent battery cells. In various embodiments, thermal towers 642 may contour to at least three battery cells. Cooling members 640 may also contour to at least one battery cell. Cooling members 640 may be flexible such to press against a top portion of the one or more battery cells to provide localized cooling. As discussed above, in embodiments where the one or more battery cells include a positive lead and a negative lead positioned on a top portion of the battery cell, a hot region may be formed. The hot region may have a temperature that is higher than any other portion of the battery cell. In such cases, it may be desirable to provide localized cooling to the hot region of the one or more battery cells to achieve more efficient cooling. Cooling members 640 may contour to the hot region of the one or more battery cells, pressing against a portion or the entire hot region of the one or more battery cells to locally cool the hot region.

Inlet 620 may be positioned along an edge of housing 612 and may be configured to introduce a cooling fluid into inlet reservoir 624. In various embodiments, inlet 620 may be positioned elsewhere within or on the cooling chamber module that facilitates introduction of the cooling fluid into inlet reservoir 624. Inlet reservoir 624 may be formed between base member 605 and reservoir separator 635. Thermal towers 642 may be operably coupled with inlet reservoir 624 via inlet tubes 622. Inlet tubes 622 may include first aperture 625 and second aperture 626. First aperture 625 may couple with inlet reservoir 624 such that a cooling fluid may be channeled from inlet reservoir 624 into inlet tubes 622 via first aperture 625. Inlet tubes 522 may be positioned within a hollow interior region of holding members 645. Inlet tubes 522 may be volumetrically smaller than the hollow interior region of holding members 645 such to form outlet volume 632.

FIG. 6B illustrates a cross-sectional perspective of outlet view 603B depicting the same cooling chamber module as inlet view 603A. However, outlet view 603B illustrates the outlet components of the cooling chamber module, including outlet 630, outlet reservoir 634, and outlet volume 632. As illustrated in FIG. 6B, outlet volume 632 may be configured to channel the cooling fluid after the cooling fluid exits from second aperture 626 of inlet tubes 622 down to outlet reservoir 634. Outlet reservoir 634 may be formed between reservoir separator 635 and a bottom end or surface of one or more battery chambers to retain the cooling fluid before the cooling fluid is disposed of. As discussed with respect to the previous figures, thermal towers 642 may form one or more battery chambers, such as battery chambers 455 and 555, having a volumetric shape complementary to one or more battery cells, such as battery cell 100. To provide cooling to a bottom surface of the one or more battery cells, optionally, cooling pads 650 may be positioned at the bottom of the battery chambers. When one or more battery cell is held within the battery chambers, the bottom surface of the one or more battery cells may contact cooling pads 650 to be cooled. Cooling pads 650 may be flexible and include thermally-conductive material to facilitate an efficient rate of heat exchange between the one or more battery cells and the cooling fluid retained in outlet reservoir 634.

Outlet reservoir 634 may be configured to retain the cooling fluid after the cooling fluid exits thermal towers 642. The cooling fluid may be retained in outlet reservoir 634 until the cooling fluid is disposed of through outlet 630. Outlet 630 may be positioned along an edge of housing 612 and may be configured to dispose of the cooling fluid out of outlet reservoir 634, and out of the cooling chamber module completely. In various embodiments, there may be more than one outlet 630. Optionally, the cooling fluid may be recirculated through a radiator such to re-cool the cooling fluid before introducing the cooling fluid back into the cooling chamber module.

Fluid movement 670 may indicate the path that the cooling fluid may take through the cooling chamber module. As illustrated, fluid movement 670 may channel through inlet reservoir 624 and into inlet tubes 622 via first aperture 625. Once inside inlet tubes 622, the cooling fluid may channel upwards from first aperture 625 to second aperture 626. The cooling fluid may exit second aperture 626 and immediately contact the interior surface of cooling member 640 to provide localized cooling to the one or more battery cells (not shown). As indicated by fluid movement 670, after the cooling fluid contacts cooling member 640, the cooling fluid may be channeled downwards through outlet volume 632. As the cooling fluid channels through the outlet volume 632, the cooling fluid may contact the interior surface of holding members 645 to provide cooling to the one or more battery cells. The cooling fluid may exit outlet volume 632 into outlet reservoir 634. As fluid movement 670 passes through outlet reservoir 634, the cooling fluid may contact an underside of cooling pads 650, providing cooling to a bottom end or surface of the one or more battery cells. The cooling fluid may be channeled through outlet reservoir 634 towards outlet 630 until the cooling fluid reaches outlet 630. At outlet 630 the cooling fluid may be disposed of from the cooling chamber module.

Figure 7:
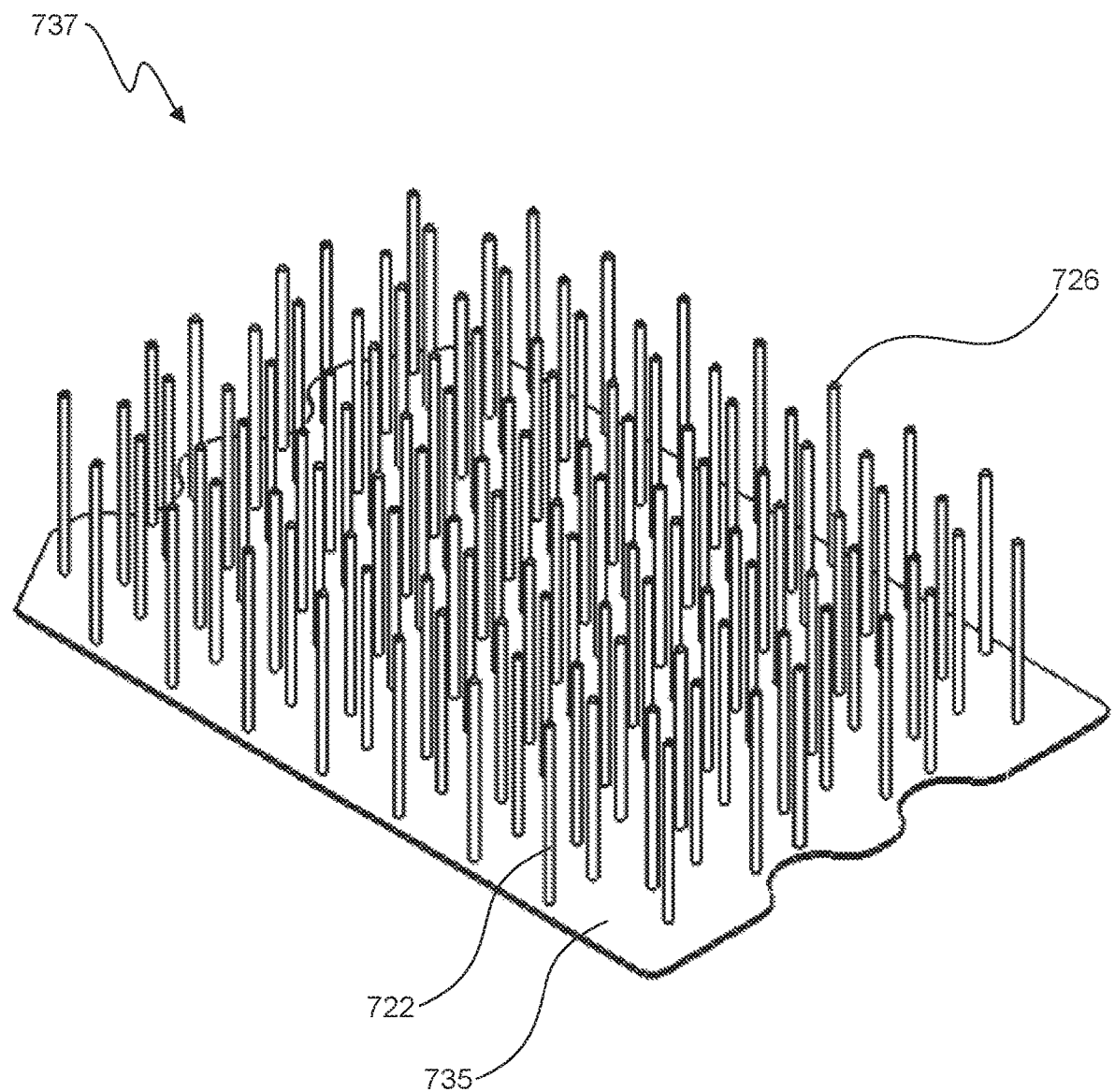
FIG. 7 illustrates a reservoir separator of a battery module cooling system according to an embodiment as disclosed herein.

Turning now to FIG. 7 which illustrates separator 737 according to an embodiment disclosed herein. Separator 737 may be part of a cooling chamber module, such as cooling chamber module 201, 301, 401, 501, and/or 601. Separator 737 may be positioned within the cooling chamber module to separate an inlet channel pathway for a cooling fluid from an outlet channel pathway for the cooling fluid. As illustrated in FIG. 7, separator 737 may include reservoir separator 735 and inlet tubes 522. Reservoir separator 735 may be the same as reservoir separator 435, 535, and/or 635. Reservoir separator 735 may be configured to form a portion of an inlet reservoir and an outlet reservoir, such as inlet reservoir 424, 524, or 624 and outlet reservoir 434, 534, or 634. Extending axially upwards from reservoir separator 735 may be one or more inlet tubes 722. Inlet tubes 722 may be the same as inlet tubes 422, 522, and/or 622 and be configured to channel a cooling fluid from an inlet reservoir and out of second aperture 726. In some embodiments, inlet tubes 722 and reservoir separator 735 may be formed as a single component. However, in other embodiments, inlet tubes 722 and reservoir separator 735 may be formed from separably coupled components. Separator 737 may be formed from a metal material, a polymeric material, a ceramic material, or any other suitable material.

Figure 8:
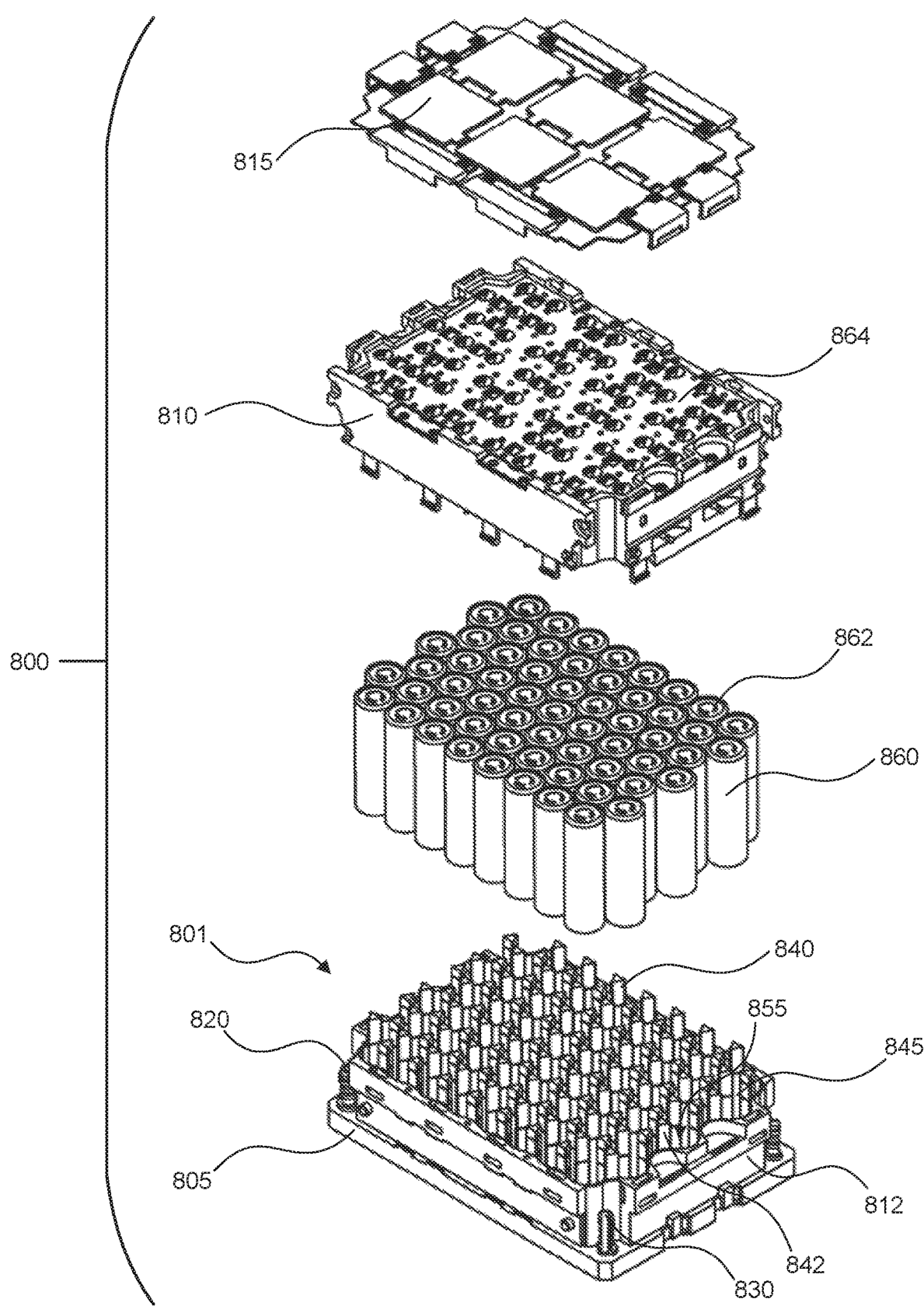
FIG. 8 illustrates an exploded perspective of a battery module cooling system including battery cells according to an embodiment as disclosed herein.

FIG. 8 illustrates an exploded perspective of battery module cooling system 800, including a plurality of battery cells 860 according to an embodiment as disclosed herein. When battery module cooling system 800 is in an assembled state, one or more components may be housed within an interior region and may not be visible. Battery module cooling system 800 may include cooling chamber module 801, top module 810, and cover 815. Cooling chamber module 801 and top module 810 may be configured to couple together to secure battery cells 860. Battery cells 860 may be the same as battery cell 100 in that both a positive lead and a negative lead may be positioned on top surface 862 of battery cells 860. Top module 810 may include current collector 864 for collecting current from battery cells 860 via top surface 862. Cover 815 may couple with top module 810 to provide cover for current collector 864.

Cooling chamber module 801 may be configured to house and cool battery cells 860. Battery cells 860 may be the same as battery cell 100. Cooling chamber module 801 may include housing 812, base member 805, inlet 820, outlet 830, and a plurality of thermal towers 842. Thermal towers 842 may extend axially upwards from base member 805 and form one or more battery chambers 855 having a volumetric shape complementary to battery cells 860. Battery cells 860 may security fit within battery chambers 855 such that a portion of battery cells 860 contact at least a portion of thermal towers 842. Thermal towers 842 may include holding members 845 and cooling members 840 contoured to battery cells 860. Holding members 845 may be rigid to provide structural support for battery cells 860 within battery chambers 855. In contrast, cooling members 840 may be flexible such to press against at least a portion of battery cells 860. Cooling members 840 may be configured to contact and cool a hot region formed on battery cells 860, such as hot region 108.

Battery module cooling system 800 may be configured to provide localized cooling to battery cells 860 by means of a cooling fluid. To introduce the cooling fluid into battery module cooling system 800, cooling chamber module 801 may include one or more inlets 820. The cooling fluid may be channeled through cooling chamber module 801 according to components and methods discussed previously, such to contact cooling members 840 to provide localized cooling to battery cells 860. After the cooling fluid is channeled through thermal towers 842, providing cooling to battery cells 860, the cooling fluid may be disposed of through one or more outlets 830. In various embodiments, the cooling fluid may be recharged or recirculated through battery module cooling system 800.

Figure 9:
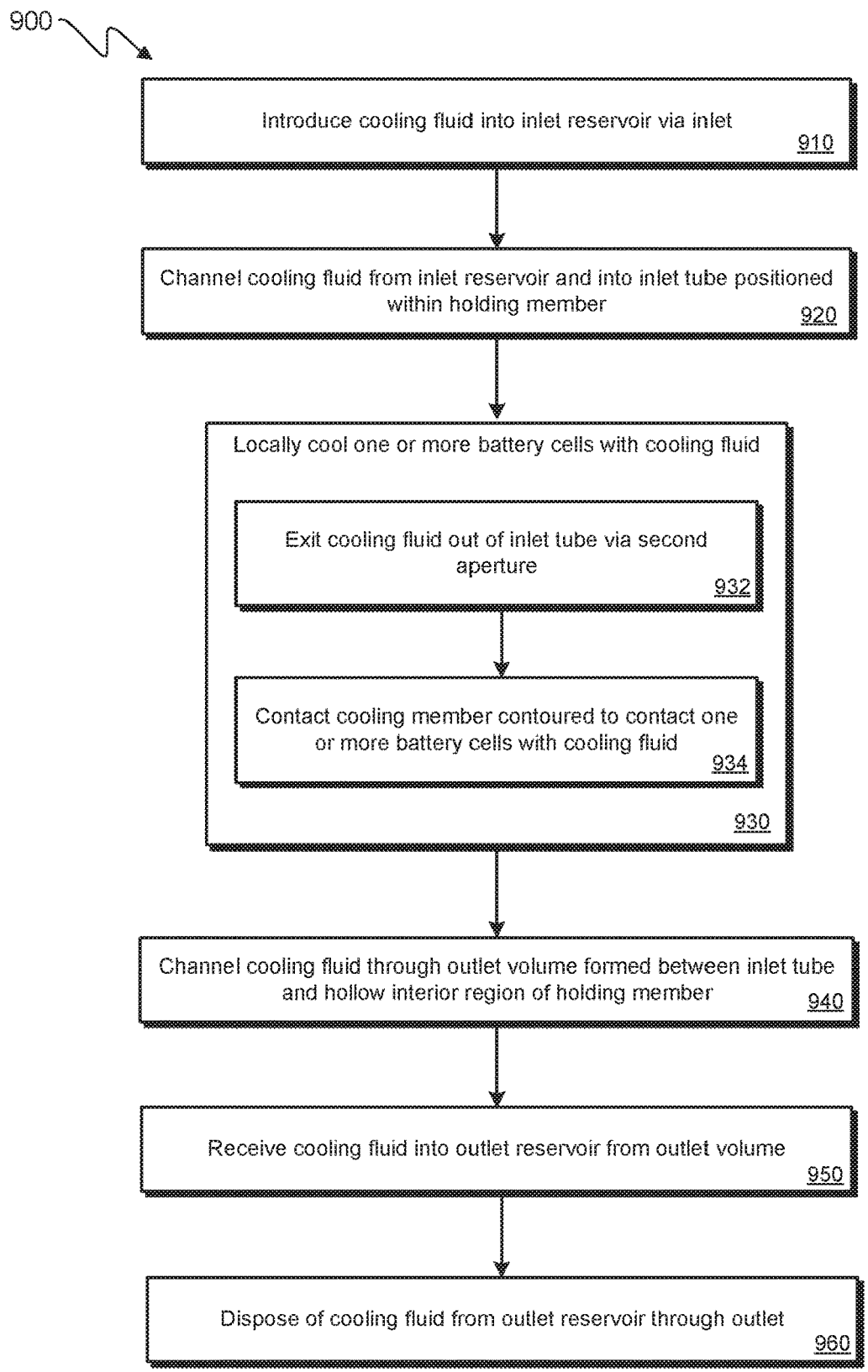
FIG. 9 illustrates a flow diagram for a method of cooling using a battery module cooling system according to an embodiment as disclosed herein.

Various methods may be performed using the systems and components detailed in relation to FIGS. 1-8. FIG. 9 illustrates an embodiment of method 900 for locally cooling one or more battery cells as disclosed herein. Method 900 may be performed using a battery module cooling system, such as battery module cooling system 200 and 800, or a cooling chamber module, such as cooling chamber module 201, 301, 401, 501, and 601. The one or more battery cells locally cooled by the battery module cooling system or cooling chamber module may be similar or the same as battery cell 100.

At block 910, a cooling fluid may be introduced into an inlet reservoir via an inlet. The cooling fluid may be pumped or otherwise channeled into a cooling chamber module. The cooling chamber module may have at least one inlet that is coupled with an inlet reservoir such that the cooling fluid may be introduced directly through the inlet and into the inlet reservoir. In embodiments, the inlet may be a port, nozzle, or any other suitable means of introducing the cooling fluid into the cooling chamber module. As discussed above, the inlet reservoir may be formed as part of the cooling chamber module, between a base member of the cooling chamber module and a reservoir separator. However, in some cases, the inlet reservoir may be a separate, individual component positioned within the cooling chamber module or outside the cooling chamber module.

At block 920, the cooling fluid may be channeled from the inlet reservoir and into an inlet tube positioned within a holding member. The holding member may be part of a thermal tower having a top aperture over which a cooling member is positioned. The cooling member may be positioned over the top aperture of the holding member such to form a seal between the holding member and the cooling member. The thermal tower, including the cooling member and holding member may contour to the one or more battery cells such that the thermal tower contacts at least a portion of the one or more battery cells. Specifically, the cooling member may contact at least a portion of the one or more battery cells to provide localized cooling. The inlet tube may include a first aperture on an axial end proximate to the inlet reservoir. When the cooling fluid is channeled from the inlet reservoir and into the inlet tube, the cooling fluid may channel through the first aperture. Once inside the inlet tube, the cooling fluid may be channeled up through the inlet channel to a second aperture on the other axial end of the inlet tube. In embodiments, the second aperture may be positioned proximate to the top aperture of the holding member or positioned above the top aperture of the holding member such to be proximate to a top of the cooling member.

At block 930, one or more battery cells may be locally cooled with the cooling fluid. The one or more battery cells may be locally cooled via a cooling member contacting at least a portion of the one or more battery cells. The cooling member may be flexible such to press against the one or more battery cells. The portion of the one or more battery cells that the cooling member contacts may be a hot region having a temperature higher than other regions of the battery cell. In embodiments, the cooling member may include a thermally-conductive material to provide efficient and effective cooling to the one or more battery cells. In embodiments, block 930 for locally cooling the one or more battery cells with the cooling fluid may include blocks 932 and 934. At block 932, the cooling fluid may exit out of the inlet tube via the second aperture of the inlet tube. In some embodiments, the second aperture of the inlet tube may be positioned axially above the top aperture of the holding member. The second aperture may be positioned proximate to a portion of the cooling member. For example, the second aperture may be positioned proximate to an interior top surface of the cooling member.

At block 934, the cooling fluid may immediately contact the cooling member to provide localized cooling to the one or more battery cells. As noted above, the cooling member may be contoured to contact at least a portion of one or more battery cells. For example, in embodiments, the thermal tower may be a triangular column having concave sidewalls. In such examples, the thermal tower and associated components (the holding member and the cooling member) may also be contoured to contact three battery cells. When the cooling fluid immediately contacts the cooling member, the cooling fluid may provide localized cooling to the one or more battery cells through the cooling member. Because the cooling member is thermally conductive, heat exchange between the hot temperature of the one or more battery cells and the cool temperature of the cooling fluid may occur, reducing the temperature of the one or more battery cells. It may be beneficial to immediately contact the cooling member with the cooling fluid directly, both temporally and spatially, after the cooling fluid exits the inlet tube to maintain the cooling fluid at a desirably cool temperature. By having the cooling fluid contact the cooling member first after exiting the inlet tube, the cool temperature of the cooling fluid may be maintained to provide more efficient cooling to the one or more battery cells contacting the cooling member.

At block 940, the cooling fluid may be channeled through an outlet volume formed between the inlet tube and the hollow interior region of the holding member. The inlet tube may be volumetrically smaller than the hollow interior region of the holding member, forming an outlet volume between an exterior surface of the inlet tube and an interior surface of the holding member. After the cooling fluid contacts the cooling member as the cooling fluid immediately exits the inlet tube, the cooling fluid may be channeled through the outlet volume. In some embodiments, the cooling fluid may be channeled through the outlet volume by means of a pump. While in other embodiments, the cooling fluid may be channeled through the outlet volume by means of gravity, or some combination of mechanical inducement and gravity. As the cooling fluid is channeled through the outlet volume, the cooling fluid may contact the interior surface of the holding member to provide further cooling to the one or more battery cells. A portion of the holding member may contact the one or more battery cells and when the cooling fluid contacts the interior surface of the holding member as the cooling fluid is channeled through the outlet volume, any remaining heat capacity may provide cooling to the one or more battery cells. Generally, the cooling fluid may retain some heat capacity after locally cooling the portion of the one or more battery cells contacted by the cooling member, such to provide cooling to the other regions of the battery cells as the cooling fluid channels through the outlet volume.

At block 950, the cooling fluid may be received into an outlet reservoir from the outlet volume. Similar to the inlet reservoir, the outlet reservoir may be formed as part of the cooling chamber module. Specifically, the outlet reservoir may be formed between a bottom surface of one or more battery chambers configured to hold the battery cells, and the reservoir separator. In some cases, however, the outlet reservoir may be an independent, separate component from the cooling chamber module. For example, the outlet reservoir may be a holding vessel located either internally within the cooling chamber module or externally outside the cooling chamber module. After the cooling fluid exits the outlet volume, either being channeled through the outlet volume by mechanical or gravity means, the cooling fluid may be retained in the outlet reservoir until the cooling fluid is disposed of out of the cooling chamber module. In some embodiments, when the cooling fluid is retained in the outlet reservoir, the cooling fluid may cool a bottom end or surface of the one or more battery cells. In such embodiments, a cooling pad may be positioned between the bottom surface of the one or more battery cells and the cooling fluid retained in the outlet reservoir. The cooling pads may be thermally conductive such to allow the cooling fluid to cool the battery cells. When the cooling fluid is retained in the outlet reservoir the cooling fluid may contact a bottom surface of the cooling pad while a top surface of the cooling pad contacts the battery cell, thereby allowing for heat exchange between the cooling fluid and the battery cell.

At block 960, the cooling fluid may be disposed of from the outlet reservoir through an outlet. The cooling chamber module may have one or more outlets. Exemplary outlets include nozzles, ports, or any other suitable means of channeling the cooling fluid from the outlet reservoir and out of the cooling chamber module. The cooling fluid may be channeled out of the outlet reservoir through the outlet by mechanical means. In embodiments, the cooling fluid may be recirculated through a radiator or another means of reducing the temperature of the cooling fluid to a desired cool temperature before reintroducing the cooling fluid back into the cooling chamber module.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A battery module cooling system, the system comprising:
    a plurality of thermal towers forming at least one battery cell chamber having a volumetric shape that is complementary to one or more battery cells such to hold the one or more battery cells, wherein at least one thermal tower of the plurality of thermal towers is contoured to contact the one or more battery cells, wherein the at least one thermal tower comprises:
        a holding member defining a hollow interior region having a top aperture, wherein the hollow interior region is configured to channel a cooling fluid; and wherein the holding member is in direct contact to the one or more battery cells;
        a cooling member positioned to contact at least a portion of each of the one or more battery cells to provide localized cooling to each of the one or more battery cells, wherein the cooling member is positioned on the top aperture of the holding member to form a seal between the holding member and the cooling member; and
    a cooling system that provides localized cooling to the one or more battery cells, wherein the cooling system comprises:
        an inlet through which the cooling fluid is introduced into an inlet reservoir;
        an inlet tube having a first aperture positioned proximate to the inlet reservoir and a second aperture positioned proximate to the top aperture of the holding member, wherein the inlet tube extends from the inlet reservoir into the hollow interior region of the holding member, the inlet tube is volumetrically smaller than the hollow interior region of the holding member such to form an outlet volume between the inlet tube and an interior surface of the holding member, and the second aperture of the inlet tube and the top aperture of the holding member are configured to contact the cooling member with the cooling fluid immediately after the cooling fluid exits the second aperture of the inlet tube to provide localized cooling to the portion of each of the one or more battery cells;

an outlet reservoir into which the cooling fluid is received from the outlet volume an outlet through which the cooling fluid is disposed of from the outlet reservoir; and at least one cooling pad positioned at a bottom end of the at least one battery cell chamber between the outlet reservoir and the at least one battery cell chamber to provide cooling to a bottom portion of the one or more battery cells.

2. The battery module cooling system of claim 1, wherein the holding member comprises a first material and the holding member comprises a second material that is different than the first material.

3. The battery module cooling system of claim 2, wherein the first material comprises a thermally-conductive flexible material.

4. The battery module cooling system of claim 1, wherein the holding member is rigid and the cooling member is flexible such to conform to and press against at least the portion of each of the one or more battery cells to provide localized cooling to each of the one or more battery cells.

5. The battery module cooling system of claim 1, further comprising the one or more battery cells, wherein each of the one or more battery cells comprises a positive lead and a negative lead positioned on a top portion of each of the one or more battery cells.

6. The battery module cooling system of claim 5, wherein the portion of each of the one or more battery cells that the cooling member is positioned to contact to provide localized cooling comprises a hot region having a higher temperature than other portions of each of the one or more battery cells, wherein the hot region is formed in each of the one or more battery cells within or proximate to the top portion.

7. The battery module cooling system of claim 1, wherein the at least one cooling pad comprises a first material, the first material has conductive properties, and the holding member comprises a second material that is different than the first material.

8. The battery module cooling system of claim 1, wherein the cooling system further comprises a plurality of inlet tubes and a reservoir separator positioned between the inlet reservoir and the outlet reservoir to separate the inlet reservoir and the outlet reservoir.

9. The battery module cooling system of claim 8, wherein the plurality of inlet tubes and the reservoir separator are a unitary component.

10. The battery module cooling system of claim 1, wherein the at least one thermal tower contours to three battery cells.

11. The battery module cooling system of claim 10, wherein the at least one thermal tower is a triangular column with concave sidewalls such that the cooling member contacts at least the portion of each of the three battery cells.

* * * * *